May 28, 1935.  J. H. JONES  2,002,778

TRANSMISSION

Filed Oct. 31, 1932   2 Sheets-Sheet 1

INVENTOR.
BY Joseph H. Jones
ATTORNEYS.

May 28, 1935.    J. H. JONES    2,002,778
TRANSMISSION
Filed Oct. 31, 1932    2 Sheets-Sheet 2
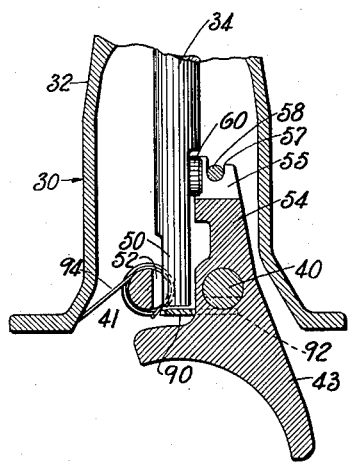
Fig. 5
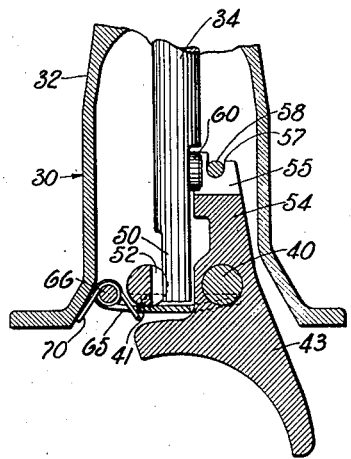
Fig. 3
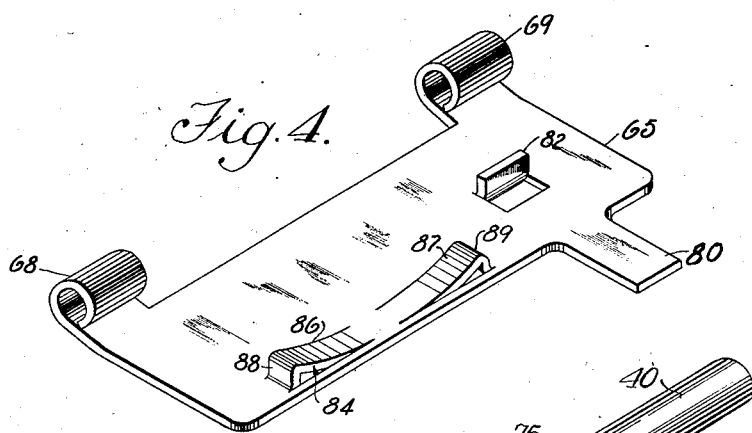
Fig. 4.
Fig. 6.
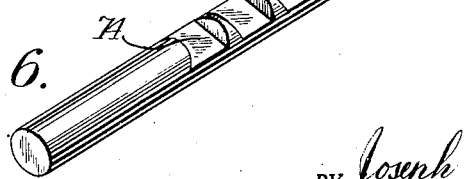
INVENTOR.
BY Joseph H. Jones
ATTORNEYS.

Patented May 28, 1935

2,002,778

UNITED STATES PATENT OFFICE 2,002,778

TRANSMISSION

Joseph H. Jones, South Bend, Ind., assignor to The Studebaker Corporation, South Bend, Ind., a corporation of Delaware Application October 31, 1932, Serial No. 640,411

6 Claims. (Cl. 74—475)

This invention relates to improvements in transmissions for automotive vehicles and particularly to transmissions of the selective sliding gear type, and has for its principal object the provision in a transmission of the character described of means for releasably locking the various speed-change gears in their operative positions.

A further object lies in the provision, in a transmission of the character described, of a locking element which is releasable by the normal manual actuation of the gear shift lever and which at the same time will positively maintain the speed-change gears in mesh in the ratio in which they are set by the gear shift lever.

A still further object lies in the provision of a locking device of the character described which may be applied to a conventional change-speed transmission without necessitating any major alteration of the transmission mechanism.

An additional object lies in the provision of a device of the character described which is simple and economical to manufacture, easy to install and which will not readily get out of order in use.

Other objects and advantages of the invention will appear as the description proceeds.

The accompanying drawings illustrate a preferred mechanical embodiment of the idea of the invention and one modified form thereof. The drawings, however, are to be taken for the purpose of illustration only and not as limiting the invention, the scope of which is to be measured entirely by the scope of the sub-joined claims.

In the drawings:

Figure 3 is a sectional view of a transmission cover taken on the line 3—3 of Figure 1 looking in the direction of the arrows.

Figure 4 is an isometric projection of a locking device constructed according to the idea of this invention, and Figure 5 is a sectional view similar to Figure 3 showing a slightly modified form of the device of the invention.

Fig. 6 is an enlarged fragmentary perspective view of one of the shifter bars showing the notches therein adapted to cooperate with the locking device to prevent accidental shifting of the bar.

Figure 1:
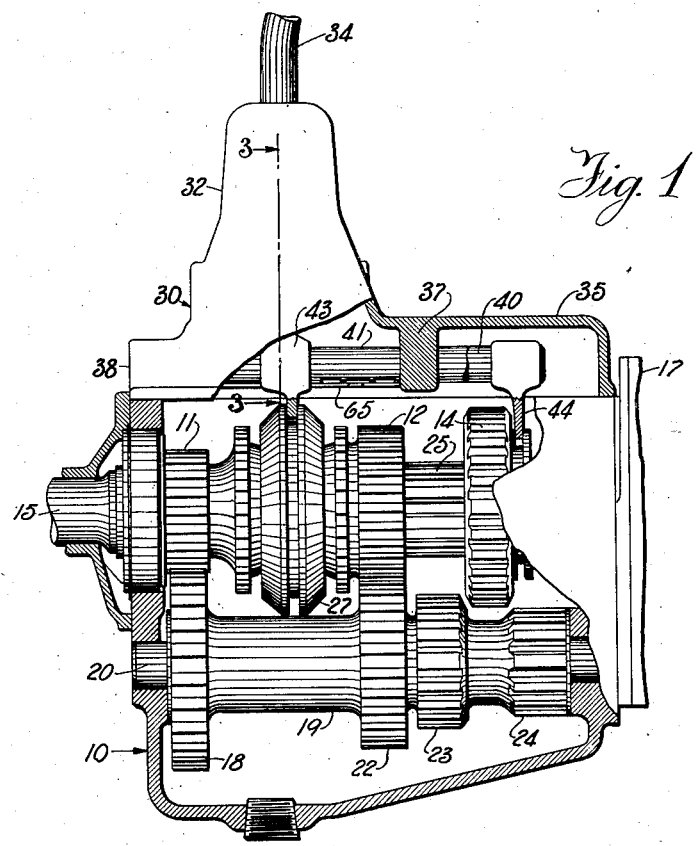
Figure 1 is a side elevational view of a transmission mechanism, a portion thereof being broken away to illustrate the application of the device of the invention to the transmission.

Referring to the drawings in detail, the numeral 10 generally indicates a transmission housing, a portion of which is broken away to illustrate some of the speed-change gears as illustrated at 11, 12 and 14 contained therein. A transmission drive shaft extending from the vehicle clutch, not illustrated, projects into the forward end of the transmission casing as indicated at 15, and in the particular construction illustrated a free-wheeling clutch housing 17 is operatively attached to the rear end of the transmission casing. In the transmission illustrated the gear 11 meshes with a gear 18 to drive an idler sleeve 19 in the conventional manner. This idler sleeve 19 is rotatably mounted upon a counter-shaft 20 and carries change-speed gears 22, 23 and 24. In this particular form of transmission the change-speed gear 14 is slidably but non-rotatably mounted upon the splined driven shaft 25 and may be moved along the driven shaft to mesh with the gear 23 or with an idler pinion driven by the gear 24 to provide first speed and reverse speed respectively. The gear 12 is constantly in mesh with the gear 22 and is rotatably but axially immovably mounted upon the driven shaft 25. A synchronizing unit 27 is mounted upon the forward end of the driven shaft 25 between the gears 11 and 12, and is operative to drivingly connect either of the gears 11 or 12 with the driven shaft 25 to provide third and second speeds respectively. The transmission is provided with a cover generally indicated at 30 having an upwardly extending portion 32 in which a gear shift lever 34 is movably mounted by means of a universal connection, not illustrated, between the gear shift lever and the top of the projection 32. The bottom portion of the cover comprises a flat topped casing 35 having a transverse apertured partition 37 therein and an end wall 38 provided with apertures in axial alignment with the apertures in said partition.

Figure 2:
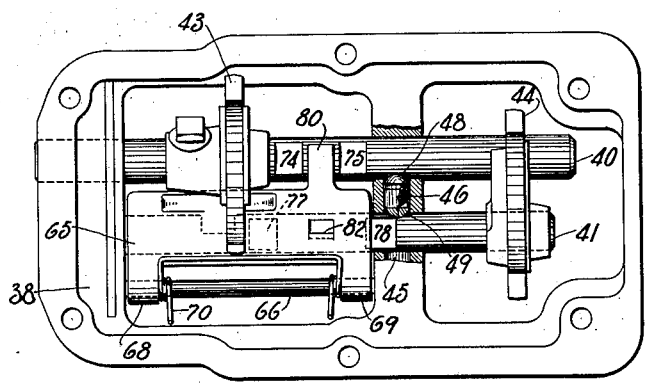
Figure 2 is a plan view of the transmission cover in inverted position showing the transmission shifter bars and shifter forks, and a locking device constructed according to the idea of this invention applied thereto.

Referring now to Figure 2 it will be observed that a pair of shifter bars 40 and 41 are slidably mounted in the apertures in the partition 37 and the end wall 38 and are positioned longitudinally of the cover and substantially parallel with each other. These shifter bars 40 and 41 carry shifter forks 43 and 44 respectively, the fork 43 being engageable with the synchronizing element 27 and the fork 44 being engageable with the shiftable gear 14. A bore 45 extends through the partition 37 transversely of the transmission cover and axially intercepts the axes of the apertures in the partition through which the bars 40 and 41 slide and an expansible detent 46 lies between the bars 40 and 41 and projects into notches 48 and 49 formed in the inner sides of the bars 40 and 41 respectively when both bars are in their neutral position. This detent is of such length when expanded as to engage both bars to resiliently retain the bars in neutral position and is of such length when compressed that only one notch can be passed by it and this arrangement maintains either of the bars in neutral position when the other bar is moved to effect a driving connection in one of the gear ratios of the transmission.

Referring now to Figure 3, it will be observed that the lower end of the gear shift lever 34 projects downwardly into the transmission cover to a position between the bars 40 and 41, and is provided at its lower end with a portion 50 adapted to engage in a rectangular notch 52 provided in the inner side of the shifter bar 41. The shifter fork 43 mounted upon the bar 40 is provided with an upwardly extending portion 54 having a U-shaped yoke 55 at the top thereof, and a pair of notches, one of which is indicated at 57, in the top of the yoke. A light bar 58 extending through the upper portion of the transmission cover fits into the notches 57 to prevent rotation of the shifter fork 43 and the bar 40 about the axis of the bar. The gear shift lever 34 is provided above the portion 50 with an extension 60 adapted to engage in the yoke 55 when the lower end of the gear shift lever is moved laterally toward the bar 40. From this description it will be observed that the lower end of the gear shift lever 34 may be moved laterally to engage in the notch 52 or the yoke 55 and that the gear shift lever may then be moved forwardly or backwardly to impart axial motion to the shifter bars 40 or 41, and thence by the shifter forks 43 or 44 to the transmission gears.

Referring now to Figure 2 it will be observed that I have provided in the transmission cover a flat plate 65 hingedly mounted in the cover by means of a bar 66 extending longitudinally of the cover from the partition 37 to the end wall 38 surrounded adjacent its ends by looped-over extensions 68 and 69 formed integrally with the plate 65. A wire spring 70 surrounds the bar 66 between the extensions 68 and 69 and bears at one end against the inner surface of the cover and at the other end against the bottom of the plate 65 to resiliently urge upwardly that portion of the plate 65 remote from the bar 66. It will now be observed that the bar 40 is provided in the lower surface thereof with a pair of rectangular flat notches or indentations 74 and 75 and that the bar 41 is provided in the lower surface thereof with a pair of similar indentations 77 and 78. As illustrated in Figure 2, both of the bars 40 and 41 are in their neutral position as indicated by the fact that the detent 46 is engaged in both of the notches 48 and 49. It will now be observed that the edge of the plate 65 remote from the bar 66 is provided with an extension 80 which lies between the notches 74 and 75. The extension 80 is in the form of a rectangular tongue of slightly less width than the notches 74 and 75, and it will be apparent that when the shifter bar 40 is moved to one or the other of its two operative positions the tongue 80 will drop into one of the notches 74 or 75 and lock the bar against axial movement until the plate 65 is sufficiently depressed to remove the tongue from engagement in the notch.

In that portion of the plate 65 directly below the bar 41 and in alignment with the tongue 80 there is provided a struck-up tongue or extension 82 which in the position of the bar 41 illustrated in Figure 2 lies between the notches 77 and 78 and is adapted to engage in one of these notches to lock the bar 41 against axial movement when the bar is in one of its two operative positions. In that portion of the plate 65 immediately below the lower end of the gear shift lever 34 is a double-ended cam generally indicated at 84 which is illustrated in detail in Figure 4. Referring to Figure 4 it will be observed that this cam 84 comprises two struck-up portions 86 and 87 which extend in opposite directions and lie along and parallel to the outer edge of the plate. These two struck-up portions lie at their inner ends in the plane of the plate and curve upwardly to their outer ends which are joined to the plate by short portions 88 and 89 respectively substantially perpendicular to the plane of the plate.

That portion of the lower surface of the bar 40 between the notches 74 and 75 is cut away to provide a cam-shaped indentation, and a similar indentation is provided in the lower surface of the bar 41 between the notches 77 and 78, so that neither of the bars when in neutral position will prevent the locking tongue on the plate 65 from engaging with the notches in the other bar if the other bar be moved to effect a speed change ratio.

The operation of the device is as follows: Considering that both shifter bars 40 and 41 are in the neutral position illustrated in Figure 2, the projection 88 will lie in the cammed-out portion of the bar 40 between the notches 74 and 75, and the bent-up tongue 82 will lie in the cammed-out portion of the bar 41 between the notches 77 and 78. If it is now desired to put the transmission in first speed, the gear shift lever 34 is moved laterally until the portion 50 engages in the notch 52 in the bar 41. The lever is then moved longitudinally of the vehicle in a rearward direction which will give the lower end of the lever and the bar 41 a forward direction. During this forward axial motion of the shifter bar 41 the tongue 82 will ride up on the cam surface between the notches 77 and 78, and at the end of the axial motion of the bar will drop into the notch 78 and be held therein by the tension of the spring 70. During this motion of the bar 41 the lower end of the gear shift lever moves along the cam portion 86 of the plate 65 also forcing the tongue 82 downwardly relative to the bar 41. Near the end of this forward motion the lower end of the gear shift lever rides off of the end of the cam 86 and when the spring 70 forces the plate upwardly so that the tongue 82 engages in the notch 78 the portion 88 of the cam perpendicular to the plate 65 will bear against the rearward side of the lower end of the gear shift lever. This action of the plate 65 will then resiliently maintain the gear shift lever against accidental movement and at the same time the engagement of the tongue 82 in the notch 78 will prevent accidental movement of the bar 41 to permit the gears actuated by the bar to move out of meshing relation. If it is now desired to go into second speed, the bar 41 is first brought back to its neutral position, the gear shift lever is then moved laterally until the projection 60 engages in the yoke 55 and the upper end of the gear shift lever is moved forwardly relative to the vehicle with a consequent rearward motion of the projection 60 and the shifter bar 40. During this rearward motion of the shifter bar 40 the extension 80 will ride up on the cam surface between the notches 74 and 75 and at the end of the rearward motion of the bar the extension 80 will drop into the notch 74 and lock the bar against accidental movement. During this motion of the bar, the lower end of the gear shift lever will ride up on the portion 87 of the cam 84 and at the end of the rearward motion of the bar, the lower end of the gear shift lever will drop over the end of the cam portion 87, and the portion 89 of the cam 84 perpendicular to the plate 65 will bear against the forward side of the lower end of the gear shift lever to prevent accidental movement of the lever. In order to place the transmission in third speed ratio, the top end of the gear shift lever is moved rearwardly giving a consequent forward motion to the extension 60 and to the shifter bar 40. The initial forward motion of the lower end of the gear shift lever will cause this lower end to ride up on the raised end of the cam portion 87, thereby depressing the plate 65 and moving the extension 80 out of locking engagement with the notch 74. Continued forward motion of the lower end of the gear shift lever causes the lower end of the gear shift lever to ride downwardly along the cam portion 87 and upwardly along the cam portion 86, and at the end of the motion to drop over the upper end of the cam portion 86 to permit the extension 80 to drop into the notch 75 thereby locking the shifted bar 40 against accidental movement. At the same time the portion 88 of the cam 84 will bear against the rearward side of the lower end of the gear shift lever and prevent accidental movement of the gear shift lever. Reverse speed is accomplished in the same manner and in all cases an initial motion of the gear shift lever to cause the lower end thereof to ride up on the raised outer end of the cam member 84 is required to depress the plate and disengage the extension 80 or the tongue 82 from the notch in which it is engaged before any motion of either of the bars 40 or 41 can take place to change the gear ratio.

This locking arrangement will prevent the transmission gears from coming out of mesh in case the gears become worn and there is a tendency for one gear to move relatively to the other and is of especial advantage in a transmission employing a synchronizing device in which there is a spring tension which must be overcome in order to establish the driving connection and which also has a tendency to disengage the driving connection during operation of the transmission.

In the modified form of the device illustrated in Figure 5, a plate 90 is hingedly mounted along one edge thereof upon the shifter bar 41 and is provided with an extension 92 engageable in notches 74 and 75 formed in the lower surface of the bar 40 in the manner as described above. A looped spring 94 surrounds a portion of the shifter bar 41 and bears at one end against the inner surface of the transmission cover, and at the other end against the plate 90 to resiliently urge the extension 92 against the lower surface of the shifter bar 40. It will be seen that in this modified form of the invention, the plate 90 or rather the extension 92 thereof will engage the shifter bar 40 to lock the transmission in second and third speed ratios. The plate, however, does not affect the shifter bar 41 and consequently does not affect the first and reverse speeds of the transmission.

While I have illustrated and described a specific mechanical embodiment of the invention, it is to be understood that the invention is not limited to this mechanical embodiment but that such changes in the size, shape and arrangement of parts may be resorted to as come within the scope of the sub-joined claims.

Having now described my invention so that others skilled in the art may clearly understand the same, what I desire to secure by Letters Patent is as follows.

What I claim:

1. In a change-speed transmission having selectively engageable gear elements and a shifter bar for engaging said gear elements in different speed ratios, a locking device for maintaining said gear elements against accidental disengagement comprising, a substantially flat plate pivotally mounted at one side of said shifter bar at substantially the horizontal axis thereof having means thereon to cause disengagement of said plate with said shifter bar during the initial longitudinal movement of said bar, and a tongue on said plate in the horizontal plane thereof engageable with said shifter bar to positively restrain said bar against accidental movement after the said longitudinal movement thereof.

2. In a change-speed transmission having selectively engageable gear elements, a shifter bar having spaced notches in the lower face thereof, a shifter fork on said bar for engaging said gear elements in different speed ratios and a shift lever for said shifter fork, a locking device for maintaining said gear elements against accidental disengagement comprising, a substantially flat plate hingedly mounted adjacent to said shifter bar in substantially the same plane as the horizontal axis of said bar extending beneath said shift lever, said plate having means thereon engageable with said shift lever to cause disengagement of said plate with said shifter bar during the initial longitudinal movement of said bar, and a tongue on said plate in the horizontal plane thereof engageable in the notches in said shifter bar to positively restrain said bar against accidental movement after the said longitudinal movement thereof.

3. In a change-speed transmission having selectively engageable gear elements, a casing surrounding said gear elements, a cover for said casing, a shifter bar slidably mounted in said cover for engaging said gear elements in different speed ratios, and a gear shift lever pivotally mounted in said cover engageable at its lower end with said shifter bar, a locking device for maintaining said gear elements against accidental disengagement comprising, a plate hingedly mounted in said transmission cover, a horizontally extending tongue on said plate extending across and engaging said shifter bar to positively restrain said bar against accidental movement, and a cam on said plate cooperating with the bottom face of said gear shift lever whereby an initial movement of said gear shift lever will move said plate to release said shifter bar.

4. In a change-speed transmission having selectively engageable gear elements, and a pair of shifter bars for engaging said gear elements in different speed ratios, a locking device for maintaining said gear elements against accidental disengagement comprising, a plate hinged in said casing at the side of one of said shifter bars, said one shifter bar being between the plate hinge and the other shifter bar, means on said plate extending substantially perpendicular to the flat face thereof, and means extending substantially parallel with said flat face, said two means being adapted to engage respectively with said shifter bars to positively restrain said bars against accidental movement.

5. In a change-speed transmission having selectively engageable gear elements, a pair of shifter bars having spaced notches therein, and shifter forks thereon for engaging said gear elements in different speed ratios, a locking device for maintaining said gear elements against accidental disengagement comprising, a plate hinged in said casing at the side of one of said shifter bars, said one shifter bar being between the plate hinge and the other shifter bar, projections on said plate extending substantially perpendicular to each other engageable in the notches in said shifter bars, and cam surfaces on said shifter bars between said spaced notches to permit said projections on said plate to engage in the notches in either of said shifter bars when the other shifter bar is in neutral position.

6. In a change-speed transmission having selectively engageable gear elements, and a pair of shifter bars for engaging said gear elements in different speed ratios, a locking device for maintaining said gear elements against accidental disengagement comprising, a member hinged on one of said shifter bars lockingly engageable with the other of said shifter bars, and a spring resiliently urging said member into locking engagement with said other shifter bar.

JOSEPH H. JONES.